(12) United States Patent
Esswie

(10) Patent No.: US 12,543,090 B2
(45) Date of Patent: Feb. 3, 2026

(54) PROACTIVE TIMING ADVANCE ACQUISITION FOR REDUCING HANDOVER INTERRUPTION DELAY

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 18/296,976

(22) Filed: Apr. 6, 2023

(65) Prior Publication Data
US 2024/0340743 A1    Oct. 10, 2024

(51) Int. Cl.
*H04W 36/00* (2009.01)
*H04W 36/30* (2009.01)
*H04W 56/00* (2009.01)

(52) U.S. Cl.
CPC ..... *H04W 36/302* (2023.05); *H04W 36/0058* (2018.08); *H04W 56/0045* (2013.01)

(58) Field of Classification Search
None
See application file for complete search history.

(56) References Cited

U.S. PATENT DOCUMENTS

| | | | |
|---|---|---|---|
| 2019/0028942 A1* | 1/2019 | Tang | H04W 36/0077 |
| 2019/0037450 A1 | 1/2019 | Chang et al. | |
| 2023/0112574 A1 | 4/2023 | Tseng et al. | |

FOREIGN PATENT DOCUMENTS

CN    115 884 291 A    3/2023

OTHER PUBLICATIONS

Technical specifications (TS) 38.201—"5G; NR; Physical layer; General description", 3GPP TS 38.201 version 15.0.0 Release 15, Sep. 2018, 14 pages.
Technical specifications (TS) 38.331—"5G; NR; Radio Resource Control (RRC); Protocol specification", 3GPP TS 38.331 version 16.1.0 Release 16, Jul. 2020, 886 pages.
(Continued)

*Primary Examiner* — Suhail Khan
(74) *Attorney, Agent, or Firm* — Amin, Turocy & Watson, LLP

(57) ABSTRACT

During a communication session with a serving radio access network node, a user equipment transmits coverage level reports corresponding to nodes neighboring the serving node as the user equipment moves. The serving node configures the user equipment with a timing advance gap period and suspends availability of resources for the communication session during the gap. The serving node may schedule the gap to coincide with a period with no traffic of the communication session to be communicated with the user equipment. During the gap, the user equipment transmits one or more configured timing advance preambles respectively corresponding to one or more neighboring nodes that, based on receiving the preambles, each prospectively determine one or more timing advance values with respect to the user equipment. After the gap, the user equipment resumes the communication session with the serving node and may use a prospectively determined timing advance during a later-instructed handover.

20 Claims, 15 Drawing Sheets

300

(56) References Cited

OTHER PUBLICATIONS

Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion mailed Feb. 19, 2024 for PCT Application No. PCT/US2023/036170, 27 pages.
INTEL—Yi Guo et al: "Discussion on the early TA acquisition", 3GPP Draft; R2-2300408; Type Discussion; NR_MOB_ENH2-CORE, 3GPP RAN 2, no. Athens, GR; Feb. 17, 2023, [https://www.3gpp.org/ftp/TSG_RAN/WG2_RL2/TSGR2_121/Docs/R2-2300408.zipR2-2300408 Discussion on the early TA acquisition.docx], 5 pages.
Intel Corporation—Yi Guo et al: "Procedure descriptions of LTM", 3GPP Draft; R2-2300400; Type Discussion; NR_MOB_ENH2-CORE, 3GPP RAN 2, no. Athens, GR; Feb. 17, 2023, [https://www.3gpp.org/ftp/TSG_RAN/WG2_RL2/TSGR2_121/Docs/R2-2300400.zipR2-2300400 Procedure descriptions ofLTM.docx] 5 pages.
Rakuten Symphony Inc: "Performance Enhancements for L1/L2 Triggered Mobility", 3GPP Draft; R2-2302778, RAN WG2, no. e-Meeting; Apr. 5, 2023, [https://ftp.3gpp.org/tsg_ran/WG2_RL2/TSGR2_121bis-e/Docs/R2-2302778.zip R2-2302778.docx], 5 pages.
ITRI: "Performance Evaluation for Early UL Synchronization", 3GPP Draft; R2-072529 Early UL Synchronization Scheme for Inter-Enodeb Handover, RAN WG2, no. Orlando, USA; Jun. 2007, 4 pages.
Notification Concerning Transmittal of Copy of International Preliminary Report on Patentability mailed Oct. 16, 2025 for PCT Application No. PCT/US2023/036170, 19 pages.
European Office Action mailed Nov. 27, 2025 for European Patent Application No. 23813917.4, 3 pages.

\* cited by examiner

| Proactive timing advance acquisition configurations | | | |
|---|---|---|---|
| Target Cell ID 1 | Preamble ID 1 | Measurement gap information 1 | TAAI 0 |
| Target Cell ID 2 | Preamble ID 2 | Measurement gap information 2 | TAAI 1 |
| ⋮ | ⋮ | ⋮ | |
| Target Cell ID N | Preamble ID i | Measurement gap information N | TAAI N |

- Existing RRC/DCI information elements

- Proactive TA measurement acquisition
  - Target Cell ID 1: TA 1  ← 315B
  - Target Cell ID 2: TA 2  ← 315C
  - ⋮

- Existing RRC/DCI information elements

PROACTIVE TIMING ADVANCE ACQUISITION FOR REDUCING HANDOVER INTERRUPTION DELAY

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

Handover is a procedure in cellular deployments that supports device mobility. However, for low-capability devices having a single receiver chain using conventional techniques, multiple handover control steps are performed before the handover procedure is complete and UE devices can resume transmitting or receiving useful payload of a communication session that was active before the handover. Conventional handover steps typically induce delay that may be referred to as handover interruption delay.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise establishing, by a first radio access network node comprising a processor, a communication session with a user equipment via a first connection between the first radio access network node and the user equipment. The method may further comprise receiving, by the first radio access network node from the user equipment, a first signal strength indication indicative of a first determined signal strength, corresponding to a second radio access network node, determined by the user equipment. The second radio access network node may be one of multiple nodes surrounding, or neighboring, the first radio access network node, which may be a serving radio access network node with respect to the user equipment.

The method may further comprise analyzing, by the first radio access network node, the first determined signal strength with respect to a first handover criterion resulting in an analyzed first determined signal strength. The first handover criterion may be a criterion used by the first radio access network node to determine whether a handover of the user equipment from being served by the first radio access network node to being served by a neighboring node (although a handover is not yet determined based on the first signal strength indication) may be likely to be determined based on the first signal strength indication. Based on the analyzed first determined signal strength being determined to satisfy the first handover criterion, transmitting, by the first radio access network node to the user equipment, a pre-handover measurement indication to be indicative to the user equipment to transmit to the second radio access network node a timing advance determination request message requesting determining, by the second radio access network node, a determined timing advance with respect to the user equipment. The method may further comprise receiving, by the first radio access network node from the user equipment, a second signal strength indication indicative of a second determined signal strength, corresponding to the second radio access network node, determined by the user equipment and analyzing, by the first radio access network node, the second determined signal strength with respect to a second handover criterion resulting in an analyzed second determined signal strength. Based on the analyzed second determined signal strength being determined to satisfy the second handover criterion, determining, by the first radio access network node, to handover the communication session to the second radio access network node. The method may further comprise transmitting, by the first radio access network node to the user equipment, a handover indication to be indicative to the user equipment to establish, using the determined timing advance, a second connection between the second radio access network node and the user equipment.

The pre-handover measurement indication may comprise a timing advance preamble, and the pre-handover measurement indication may be indicative to the user equipment to include the timing advance preamble in the timing advance determination request message. The timing advance preamble may be configured to correspond to the second radio access network node.

In an embodiment, the method may further comprise transmitting, by the first radio access network node to the second radio access network node, a timing advance preamble. The timing advance preamble may be transmitted in a timing advance acquisition configuration via a backhaul link/interface.

In an embodiment, the method may further comprise receiving, by the first radio access network node from the second radio access network node, the determined timing advance. The determined timing advance may be received from the second radio access network node via a backhaul link/interface.

The pre-handover measurement indication may be indicative to the user equipment that the first radio access network node is to receive, from the second radio access network node, the determined timing advance.

In an embodiment, the method may further comprise transmitting, by the first radio access network node, the determined timing advance to the user equipment via a downlink control channel information message. The downlink control channel information message may comprise resource scheduling information corresponding to the first radio access network node. The pre-handover measurement indication may comprise an identifier corresponding to the second radio access network node. The handover indication may comprise the determined timing advance, and the handover indication may be transmitted via a radio access control signal message.

The pre-handover measurement indication may be indicative to the user equipment that the user equipment is to receive, from the second radio access network node, the determined timing advance. The pre-handover measurement indication may be indicative to the user equipment that the user equipment is to transmit, to the first radio access network node, the determined timing advance.

The pre-handover measurement indication may be indicative of a timing advance determining time resource during which the user equipment is to transmit the timing advance determination request message. The timing advance determining time resource may comprise a timing advance gap period. The timing advance determining time resource may be scheduled by the first radio access network node to coincide with a period during which traffic corresponding to the communication session is not scheduled to be transmitted to, or received from, the user equipment. The pre-handover measurement indication may be indicative to the user equipment that the communication session via the first connection between the first radio access network node and the user equipment is to be halted during the timing advance determining time resource.

In an embodiment, the pre-handover measurement indication may be indicative to the user equipment that the first radio access network node is to receive, from the second radio access network node, the determined timing advance, and the pre-handover measurement indication may be indicative to the user equipment that the communication session via the first connection between the first radio access network node and the user equipment is to resume after the user equipment transmits the timing advance determination request message. The pre-handover measurement indication may be indicative to the user equipment that the user equipment is to immediately switch back to monitoring resources previously configured for the communication session after transmitting the timing advance determination request message without waiting to receive from the second radio access network node the determined timing advance.

In another example embodiment, a first radio access network node comprises a processor that may be configured to receive, from a user equipment, a timing advance preamble indicative of a request for a determination of a timing advance, corresponding to the first radio access network node with respect to the user equipment, and to determine the timing advance corresponding to the first radio access network node with respect to the user equipment. The timing advance may be used by the user equipment when conducting a handover from a second radio access network node, which may be currently serving the user equipment, to the first radio access network node, and the first radio access network node may determine the timing advance before the handover from the second radio access network node to the first radio access network node is initiated by the second radio access network node.

The processor may be further configured to receive, from the second radio access network node, the timing advance preamble; and responsive to receiving the timing advance preamble from the user equipment, analyze the timing advance preamble received from the user equipment with respect to the timing advance preamble received from the second radio access network node to result in an analyzed timing advance preamble. The first radio access network node may determine the timing advance responsive to the analyzed timing advance preamble being determined as being the same as the timing advance preamble received in the timing advance acquisition configuration.

In an embodiment, the processor may be further configured to transmit, to the user equipment, the timing advance. In another embodiment, the processor may be further configured to transmit, to the second radio access network node, the timing advance.

In another example embodiment, a non-transitory machine-readable medium may comprise executable instructions that, when executed by a processor of a first radio access network node, facilitate performance of operations, that may comprise establishing a communication session with a user equipment. The operation may further comprise transmitting, to a second radio access network node, a timing advance preamble to be indicative to the second radio access network node to determine a timing advance corresponding to the second radio access network node with respect to the user equipment upon receiving, from the user equipment, a timing advance determination request message comprising the timing advance preamble. The operations may further comprise transmitting, to the user equipment, a pre-handover measurement indication indicative to the user equipment to transmit to the second radio access network node the timing advance determination request message requesting, from the second radio access network node, the timing advance corresponding to the second radio access network node with respect to the user equipment.

In an embodiment, the pre-handover measurement indication may be indicative to the user equipment of a deactivated session resource period (e.g., a timing advance gap period), wherein the deactivated session resource period is to correspond to a period during which a resource used for the communication session is to be deactivated with respect to the user equipment, and wherein the pre-handover measurement indication is indicative to the user equipment to transmit to the second radio access network node the timing advance determination request message during the deactivated session resource period.

In an embodiment, the pre-handover measurement indication may be indicative to the user equipment that the first radio access network node is to receive, from the second radio access network node, the timing advance, and the pre-handover measurement indication may be indicative to the user equipment that the resource used for the communication session is to resume after an expiration of the deactivated session resource period.

In an embodiment, the pre-handover measurement indication may be indicative to the user equipment that the user equipment is to receive the timing advance from the second radio access network node.

In an embodiment, the pre-handover measurement indication may be indicative to the user equipment to transmit, to the first radio access network node, the timing advance after receiving the timing advance from the second radio access network node. The pre-handover measurement indication may be indicative to the user equipment that the communication session is to resume after transmission, by the user equipment to the first radio access network node, of the timing advance. In an embodiment, the user equipment may transmit the timing advance to the first radio access network node after receiving the timing advance from the second radio access network node.

BRIEF DESCRIPTION OF THE DRAWINGS

FIG. 12 illustrates an example timing advance acquisition configuration.

FIG. 13 illustrates an example timing advance measurement request.

DETAILED DESCRIPTION OF THE DRAWINGS

Figure 1:
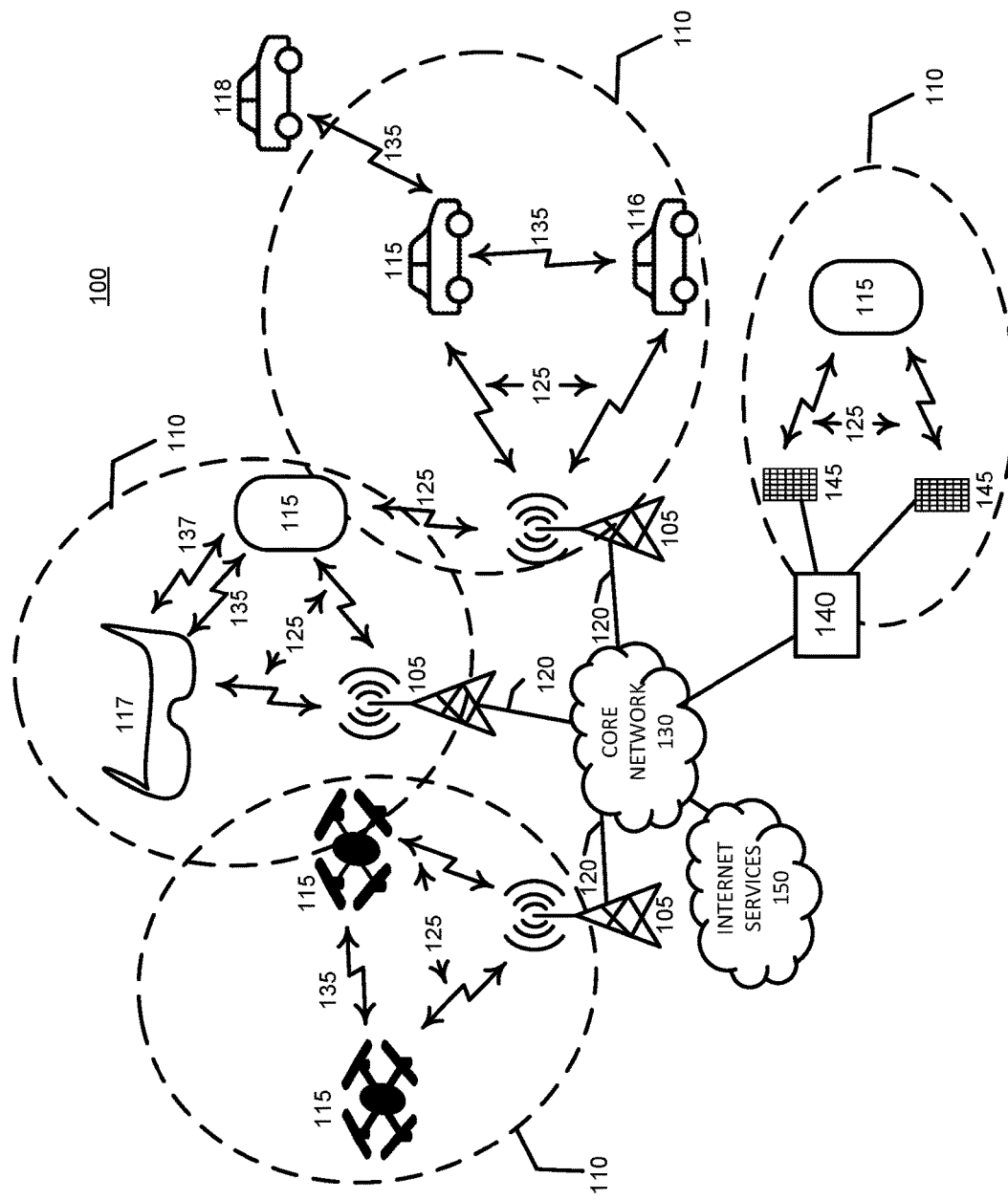
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (eg, an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Handover and mobility procedures facilitate service continuity over cellular networks. A handover may be implemented when a user equipment connected to a RAN (e.g., a RAN with which the UE has a currently established communication session, which may be referred to as a serving RAN or a source RAN) moves from coverage of a source RAN node to an adjacent RAN, which may be referred to herein as a target RAN. Moving from coverage of one RAN to coverage of another RAN may refer to a user equipment that is moving experiencing a decrease is signal strength with respect to a serving RAN while experiencing an increase in signal strength with respect to another RAN. A user equipment may be moving from coverage corresponding to a serving, or source, RAN while conducting an active network session with the serving RAN (e.g., while the UE is receiving or transmitting data). Thus, the source RAN node may trigger, initiate, implement, or otherwise cause a handover procedure such that the active and connected UE is handed over to being served by a target RAN, into the coverage of which the UE may be moving, and the communication session may resume via the target RAN to which the UE has been handed over.

Reduction of interruption delay related to handover is desirable to support seamless mobility and may be especially desirable for latency-critical applications running on, or being supported by, a user equipment device. A primary delay-contributing control step during handover according to conventional techniques is uplink timing advance ("TA") acquisition. According to conventional techniques, timing advance acquisition typically includes a user equipment reading and blind-decoding basic system information blocks corresponding to a target RAN, subsequently transmitting an uplink preamble over determined access resources, and finally receiving a large configuration message (including uplink timing advance information) measured by the target RAN based responsive to receiving the transmitted preamble. Such timing advance acquisition according to conventional techniques comprises multiple instants of blind decoding and multiple transmission and reception operations by the user equipment, and typically leads to more than 20 millisecond of delay while a UE device acquires a timing advance to be used for a handover that has already been initiated.

During a handover process, according to existing techniques, a moving user equipment performs several radio procedures with respect to a target RAN node/cell before the UE can connect with the target RAN and be able to receive or transmit data with the target RAN. Radio procedures that a UE being handed over may perform include coverage and beam signal strength measurement, downlink synchronization, and acquisition of a timing advance, which may be used for synchronization in the uplink direction. TA acquisition typically causes about 15 millisecond to 20 millisecond of delay as previously mentioned. A primary contributor to handover delay results from during TA acquisition when a currently active communication session between a UE and serving RAN is halted for a UE that has a single radio transceiver chain because the radio circuitry of the UE is tuned to communicate with the target RAN, Such a deactivating, halting, stopping, etc. of a communication session may impose negative consequences with respect to latency and reliability for services that may have been using the communication session. A dual active protocol stack ("DAPS") handover procedure, according to which a UE device having two different radio frequency radio chains can perform handover procedures with a target cell, such as acquiring a TA, while still receiving or transmitting traffic payload via an established and currently active communication session with a source RAN. However, a DAPS procedure is only useful for a multi-receiver device that can facilitate being connected to two RAN nodes at the same time. User equipment with at least two receiver chains can support simultaneous/dual-cell connections and can thus perform handover-completion steps with a target RAN while still receiving or transmitting traffic with a current serving RAN without experiencing significant handover interruption delay (e.g., in some cases, handover delay for a dual active UE may be almost 0 millisecond). However, for low-capability UE devices (e.g., a UE with a single receiver chain), handover interruption delay using conventional techniques typically causes perceptible disruption (e.g., by a user of a UE being handed over).

A handover procedure may be initiated upon occurrence of a triggering condition, which may be referred to as handover event. A handover criterion may be configured such that satisfaction of a handover criterion triggers a handover from a source cell to a target cell. An example of a handover criterion being satisfied may include a received coverage level (e.g., a signal strength of a reference signal received by a user equipment) corresponding to a serving cell falling below a configured coverage. Another example of a handover criterion being satisfied may include a received coverage level corresponding to an adjacent cell exceeding (e.g., being stronger, or higher) than a received coverage of the serving cell by an offset amount. Thus, user equipment devices typically are configured to regularly measure coverage levels from detected adjacent cells and report measured coverage levels to the RAN serving the UE to be used by the serving RAN to determine whether, or when, to hand over serving of the UE to a different RAN node.

Upon a serving RAN determining to handover a UE to a target RAN, using conventional techniques certain actions are typically performed, including the source/serving RAN transmitting a handover command to the UE and halting an established communication session between the source RAN and the UE. The source/serving RAN may then transmit a handover provisioning command to a target RAN via backhaul interface links to apprise the target RAN of the pending handover and to identify if there are any access restrictions corresponding to the target RAN/cell. The UE switches radio parameters from being tuned to communicate with the source RAN to being tuned to communication with the target RAN. Upon switching tuning of radio parameters, the UE typically performs actions before beginning communication via the target RAN. Actions that the UE typically performs during handover according to conventional techniques include measuring synchronization signal block ("SSB") signal strength of the target RAN and determining a best available downlink beam and reading and decoding multiple available system information block ("SIB") signal messages for determining access information corresponding to the target RAN. The UE then transmits an uplink preamble towards the target RAN for the target RAN to use in measuring a timing advance with respect to the UE. Finally, the UE reads and decodes an RRC configuration message received from the target RAN that typically includes a measured uplink timing advance as well as other access configuration information. The RRC configuration is typically a large file and is received over a long period (e.g., may causes a perceptible delay in traffic being communicated to or from the UE). Only after the UE has received the timing advance corresponding to the target RAN can the UE resume a communication session with the target RAN (now the current serving RAN), which session may have been halted by the previous serving RAN as part of the handover to the target RAN. During a handover according to existing techniques, a purpose of the UE determining a coverage level/signal strength and best available downlink beam, reading SIB messages, and transmitting a preamble is to obtain a timing advance corresponding to the target RAN to facilitate adjustment of the UE's control and/or data transmission timing to be aligned with the target RAN. However, the time required to perform those actions can takeover over 20 millisecond, a delay that may cause a violation of a critical latency budget corresponding to services or applications having a stringent Quality-of-Service.

Embodiments disclosed herein facilitate proactive/prospective timing advance acquisition. A current serving RAN and a potential target RAN may exchange configuration messages and messages comprising TA before a handover is initiated by a serving RAN, thus minimizing, or eliminating, communication session payload delivery delay due to acquiring uplink timing advance information during a handover period.

Proactive/Prospective Timing Advance Acquisition.

Embodiments disclosed herein facilitate reducing handover delay for user equipment having a single RF radio chain by TA acquisition being performed before a handover procedure is initiated. Using embodiments disclosed herein, a user equipment may acquire a TA of a target RAN before the handover is performed, thus avoiding delay that would otherwise be caused by TA acquisition performed during handover. To facilitate TA acquisition before a handover is initiated, a user equipment may be dynamically configured with TA acquisition timing resources, or TA time 'gaps', during which dynamic scheduling of traffic with the source RAN/cell is temporarily halted for devices to proactively participate in prospective measurement of one or more TA(s) corresponding to one or more potential target RAN nodes. Configured dynamic TA timing gaps can be scheduled, by a source RAN node's scheduler, such that a latency budget of ongoing payload transmission or reception is not violated, (e.g., a gap/period used for acquiring a TA corresponding to an adjacent cell is scheduled such that communication of payload of a current communication with the source RAN/cell is not impacted). A serving RAN may dynamically configure and schedule a TA acquisition timing gap for when there is an inter-packet-arrival-dormant period of a traffic flow corresponding to the UE that is larger than the scheduled TA acquisition timing gap. The TA acquisition timing gap may be referred to as a timing advance determining time resource. The TA acquisition timing gap may be referred to as a deactivated session resource period.

In an embodiment, a novel inter-cell coordination exchange procedure may be implemented to facilitate a serving RAN in receiving a proactively acquired, or prospectively acquired (e.g., acquired in anticipation of a handover but before a handover determination is made by a serving RAN or before the serving RAN initiates a handover), TA measurement of a user equipment device from an adjacent currently-non-serving RAN. By a potential target RAN transmitting a proactively/prospectively determined TA corresponding to a UE that may be handed over to the target RAN, a configured timing gap configured for a UE to cooperate with a potential target RAN in determining a TA and then the UE transmitting to the serving RAN is reduced because the UE can revert to the communication session with the serving RAN that was currently ongoing before being paused to determine the TA with the potential target RAN. A UE being served by a source RAN/cell may be configured with a timing gap long enough to transmit a novel uplink TA preamble towards one or more adjacent potential target RAN cells before reverting to the communication session with the current serving cell. Thus, the serving cell itself may obtain TA measurement results from the target cell(s), and accordingly, report the TA measurement(s) back to the configured UE devices. Accordingly, a serving RAN may transmit multiple TA measurement reports corresponding to multiple RAN nodes other than the serving RAN. As a result, when, and if, a user equipment device with respect to which one or more TA(s) has/have already been determined is configured for a handover, the UE may adopt a TA measurement corresponding to a target RAN and complete handover to a target RAN to which the TA corresponds without the typical delay of about 20 millisecond being used to obtain a TA during handover.

Using embodiments disclosed herein, novel RAN-to-RAN and RAN-to-UE signaling procedures facilitate user equipment devices acquiring a timing advance proactively/prospectively before a handover is initiated, thus eliminating delay caused by TA acquisition while communication with a serving RAN has been halted during handover. Adjacent RAN nodes may coordinate (e.g., share) via Xn/backhaul links a configured group of special preambles and resource occasions dedicated to proactive/prospective TA acquisition. Receiving by a source/serving RAN of a signal strength measurement report from an active UE device may be indicative of a received coverage level corresponding to the serving RAN being degraded and/or may be indicative that a received coverage level corresponding to one or more adjacent RAN nodes, which may be referred to as target RAN nodes or potential target RAN nodes (potential in the sense that the serving RAN may not have determined to hand over the UE to a given potential target RAN yet), is better than coverage corresponding to the currently serving/source RAN. Such indication may be analyzed by the serving RAN to determine that a received signal strength satisfies a first handover criterion, wherein satisfying the first handover criterion may trigger the serving RAN to transmit a measurement request message. A measurement request message may be referred to as a pre-handover measurement indication, indicative to the user equipment to perform a proactive/prospective TA measurement corresponding to a potential target RAN.

Via the pre-handover measurement indication, the current serving RAN can dynamically configure the UE device with the TA acquisition preambles and transmission resources to be used to prospectively determine a TA corresponding to a potential target RAN with respect to the UE. The pre-handover measurement indication may comprise a frequency resource and a timing advance resource 'gap', or period, during which a UE is to switch radio parameters to be tuned to communicate with a potential target RAN and transmit a special TA preamble toward a target RAN. Thus, during a configured TA timing gap, a UE may switch radio parameters from being tuned to communicate with a serving/source RAN to being tuned to communicate with a potential target RAN and immediately transmit a configured TA preamble via a configured frequency resource during the TA timing gap. A TA preamble configuration transmitted from a serving/source RAN to a UE may comprise system information block information and synchronization signal block information corresponding to the potential target RAN, thus facilitating a UE in avoiding having to read system information blocks and synchronization signal blocks of a potential target RAN, since the UE has already been configured with the TA acquisition preamble and its respective transmission resources by the source RAN/cell. Accordingly, a UE does not have to read and decode SSB signals or SIB messages for purposes of transmitting a TA preamble because the UE already has been configured by a current serving RAN with a TA preamble and timing and frequency resources to be used by the UE to transmit a TA request message to a potential target RAN.

Because a UE may be configured with a TA preamble and corresponding timing gap and frequency resources to use to transmit the TA preamble, the configured timing gap during which the UE switches from a source RAN to a target RAN can be very short due to the UE performing minimal actions and not having to blindly decode SSB signals and SIB messages before switching back to the source RAN. Although the UE may switch from communication with a source RAN to communication with a target RAN during a TA gap, the TA gap may be reduced compared to the 20 millisecond delay typically used to obtain a TA while a UE is not connected with the source RAN during a handover according to conventional techniques. Furthermore, a scheduler at the serving RAN may schedule the TA gap to occur when there is no scheduled traffic to or from the UE such that even the smaller amount of time to determine a TA during a configured TA gap has minimal, or no, negative impact on ongoing traffic flows of a communication session between the UE and the source RAN.

Figure 2:
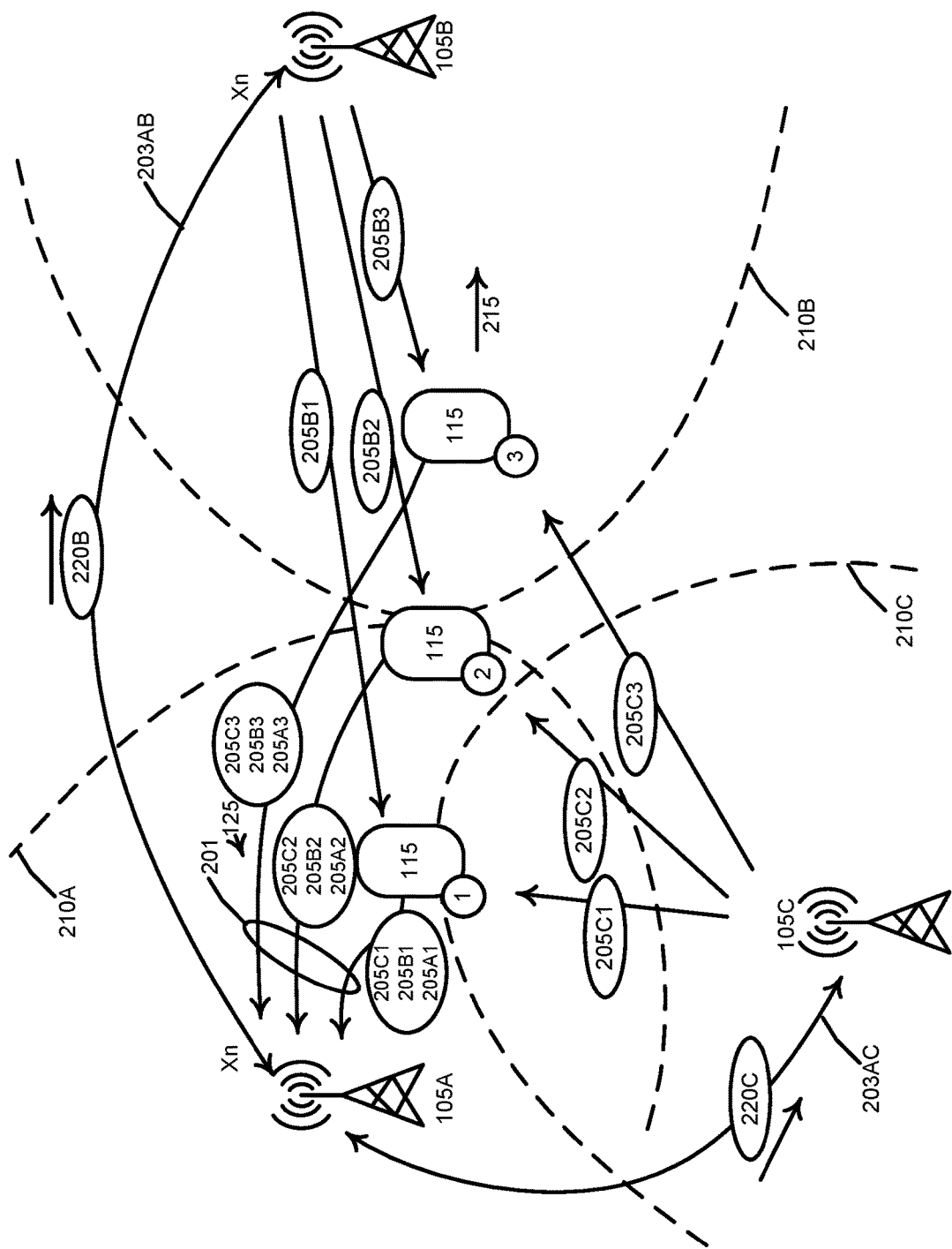
FIG. 2 illustrates an example embodiment of a user equipment moving from being in range of a serving radio access network node into range of a target radio access network node.

Turning now to FIG. 2, the figure illustrates environment 200 where a user equipment 115 is traveling direction 215 at position 1. The user equipment 115 may be within signal range 210A corresponding to serving ran 105A and at the edge of signal range 210C corresponding to radio access node 105C. In position 2, user equipment 115 may have moved outside of signal range 210C and may now be located at the periphery, or edge, of range 210A and also at the periphery of range 210B corresponding to node 105B. User equipment 115 may regularly report signal strength information 205 corresponding to radio access network nodes from which it can detect reference signals in a signal strength information message via a communication session 201 that may be established via an established radio connection between the user equipment and radio access node 105A.

Serving radio access network node 105A may determine to transmit a timing advance preamble 220B to radio access node 105B and a timing advance preamble 220C to radio access node 105C via Xn backhaul links 203AB and in 203AC, respectively. Preambles 220B and 220C may be transmitted to UE 115 in a timing advance acquisition configuration 1200 (described in reference to FIG. 12). Upon determining that user equipment 115 is moving away from radio access node 105A and toward radio access network node 105B (e.g., the UE is moving in direction 215), radio access network node 105A may determine that a timing advance corresponding to radio access network 105B should be determined with respect to the UE, even before radio access network node 105A may determine to initiate a handover of the user equipment from radio access network node 105A to radio access network node 105B. The determination to instruct the user equipment 115 to cooperate with radio access network node 105B to determine a timing advance corresponding to radio access network 105B with respect to the user equipment may be based on a signal strength 205B2 being stronger than a signal strength 205C2 and also based on the signal strength 205B2 being stronger than a signal strength corresponding to the connection with RAN 105A being used to carry communication session 201. After a timing advance corresponding to radio access network node 105B has been determined with respect to the user equipment, when user equipment 115 is at position 3, 105A radio access network node may determine to initiate a handover of user equipment 115 to radio access network node 105B, for example, based on signal strength 205B3 being stronger than signal strengths 205A3 or 205C3, and the user equipment may use the timing advance determined before radio access network node 105A initiated the handover to facilitate the handover.

Figure 3A:
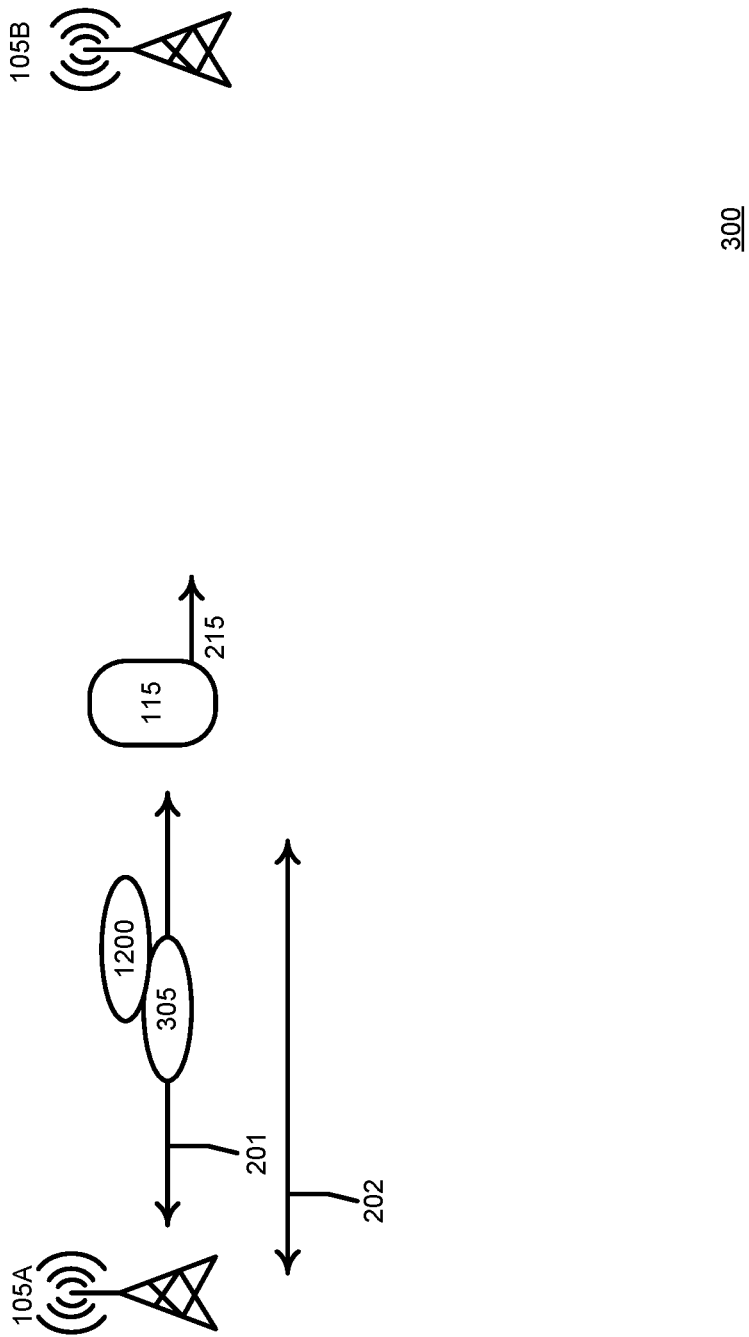
FIG. 3A illustrates an example embodiment of a serving radio access network node requesting that a user equipment transmit a timing advance determination request message.
Figure 3B:
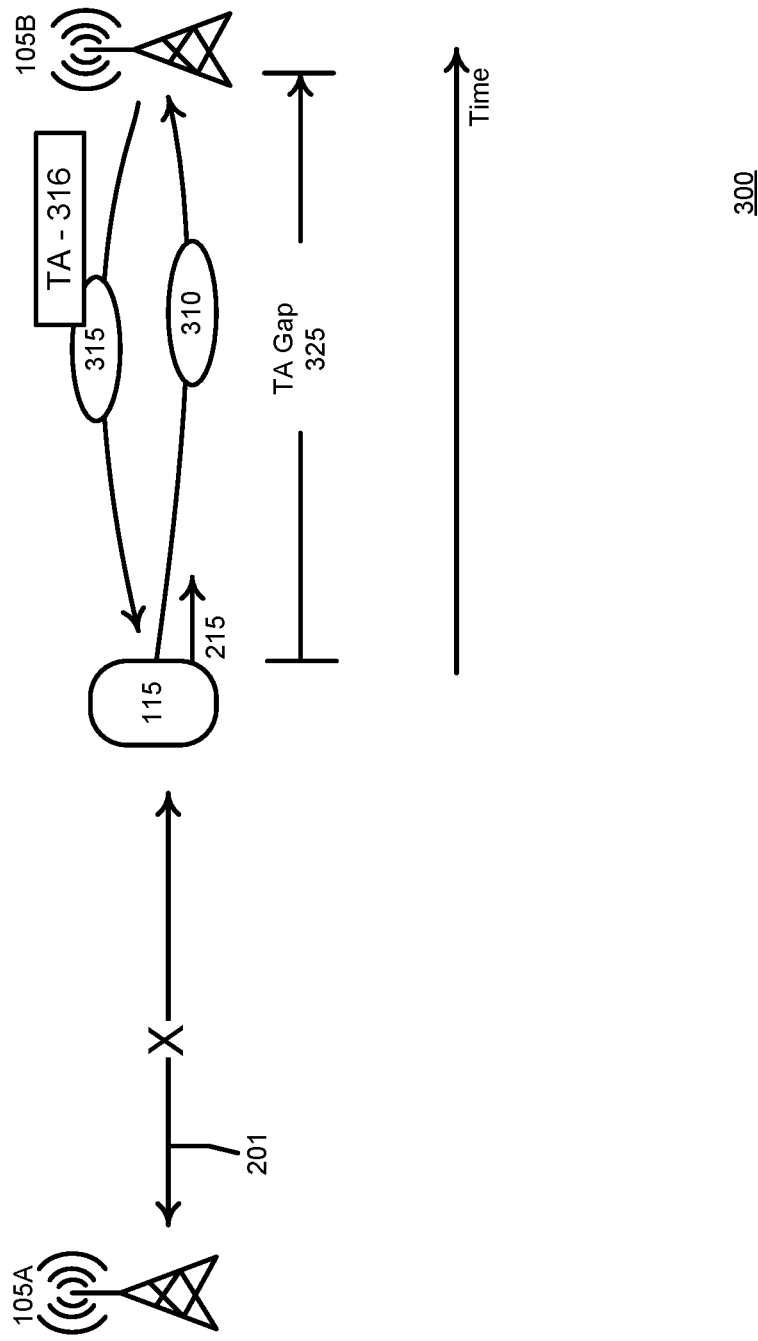
FIG. 3B illustrates an example embodiment of a user equipment transmitting a timing advance request message to a target radio access network node.

Different embodiments may facilitate a UE in obtaining a TA, which may be referred to as a TA measurement, or a TA report. In embodiment environment 300 shown in FIG. 3A, a source RAN 105A may transmit to UE 115, moving in direction 215, a pre-handover measurement indication message 305. Pre-handover measurement indication message 305 may be transmitted via session 201 via first connection 202. Pre-handover measurement indication message 305 may comprise a configuration 120 described in reference to FIG. 12 and may be indicative to the user equipment that the user equipment is to receive, from potential target radio access network node 105B responsive to the UE transmitting a timing advance determination request message 310, a TA corresponding to the potential target RAN during a configured TA gap 325, as shown in FIG. 3B. Timing advance determination request message 310 may request determining, by the potential target RAN, a determined timing advance with respect to UE 115.

After transmitting a timing advance determination request message 310 to potential target RAN 105B during TA gap 325, UE 115 may wait, during the TA gap, to receive a TA 316, or a determined TA, from potential target RAN 105B in a TA message 315 from the potential target RAN 105B responsive to the timing advance determination request message. TA message 315 received by the UE may comprise a measured uplink TA level, determined by the potential target RAN, in terms of milliseconds, subframes, or symbols, for example.

Figure 3C:
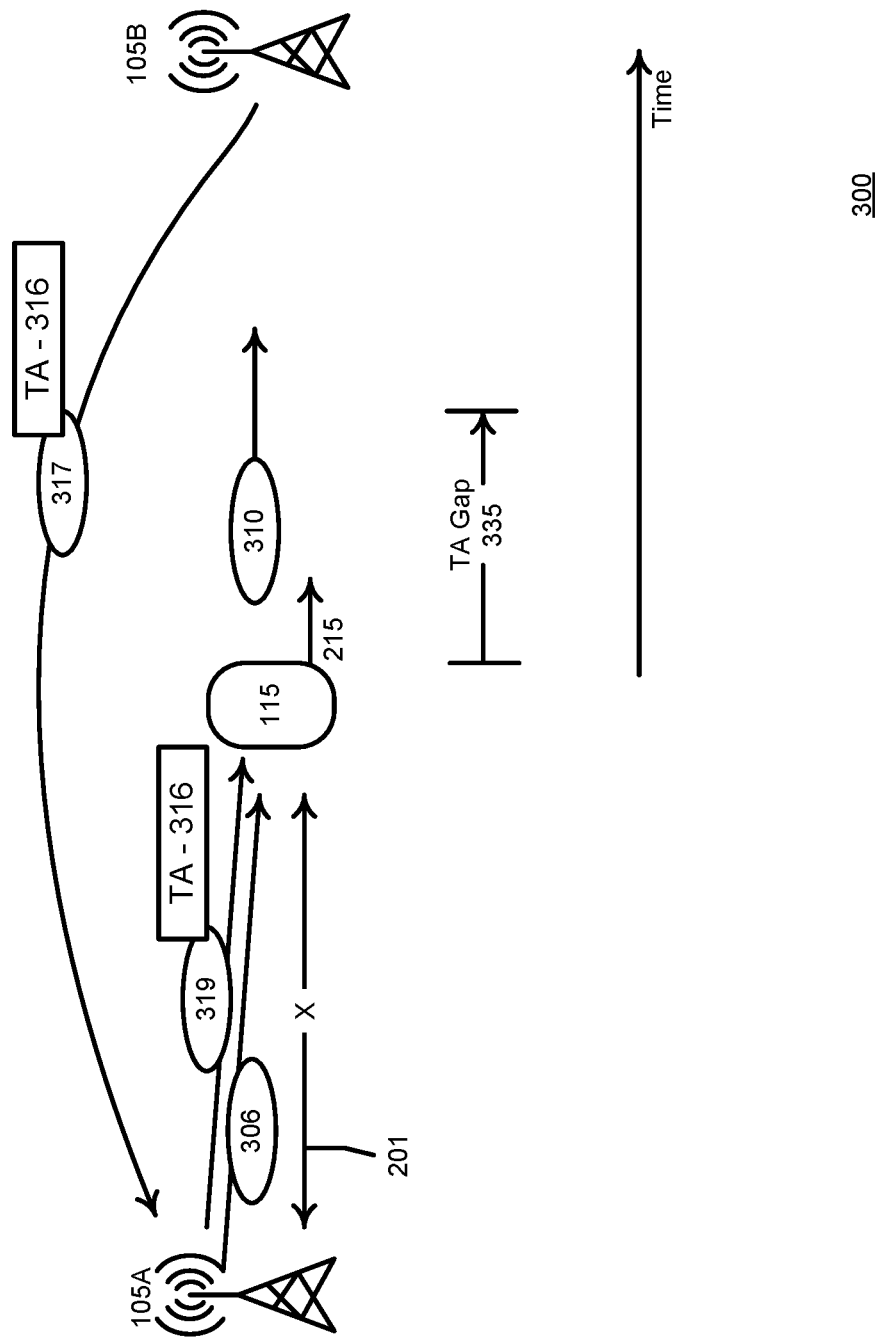
FIG. 3C illustrates an example embodiment of a serving radio access network node transmitting a timing advance a user equipment to be used to establish a communication connection with a target radio access network node.

In another embodiment, in environment 301 shown in FIG. 3C, instead of waiting to receive a TA message 315 from a potential target RAN, UE 115 may be configured, according to a pre-handover measurement indication 306, to switch, tune, or otherwise adjust, radio parameters back to being adjusted to communicate with the source/serving RAN 105A after transmitting a timing advance determination request message 310 instead of waiting to receive a determined TA 316 in a TA message 315 from the potential target RAN before switching back to radio parameters that facilitate communication with the source/serving RAN 105A. The measured TA 316 may be transmitted to, and received by, source RAN 105A, in a TA report message 317. Source RAN 105A may then transmit/report the TA 316 determined by potential target RAN 105B to UE 115 in a TA message 319 as part of communication session 201 with the UE that may have been established before the UE transmitted the timing advance determination request message during TA gap 335. TA message 319 may comprise a downlink control information comprising information according to format 1300 described in reference to FIG. 13.

As can be seen in FIG. 3B and FIG. 3C, TA gap 325 is shown in FIG. 3B as being longer than TA gap 335 shown in FIG. 3C to illustrate a reduction in TA gap length that may result from configuring UE 115 to transmit a TA determining request message 310 and then switch back to resume communication with source RAN 105A via communication session 201 instead of waiting to receive a TA 316 from RAN 105B. The 'X' that illustrates a halting of communication session 201 is shown larger in FIG. 3B than in FIG. 3C to indicate that session 201 is deactivated for a shorter period in the embodiment shown in FIG. 3C than in the embodiment shown in FIG. 3B. The embodiment shown in FIG. 3B thus implements a longer duration timing advance gap 325 than timing advance gap 335 shown in FIG. 3C, but the embodiment shown in FIG. 3B does not use inter-RAN coordination via backhaul links. The embodiment shown in FIG. 3C may facilitate a faster device switching time since source RAN 105A receives the TA measurement report 315 from target RAN 105B but uses inter-RAN messaging via backhaul links.

Figure 3D:
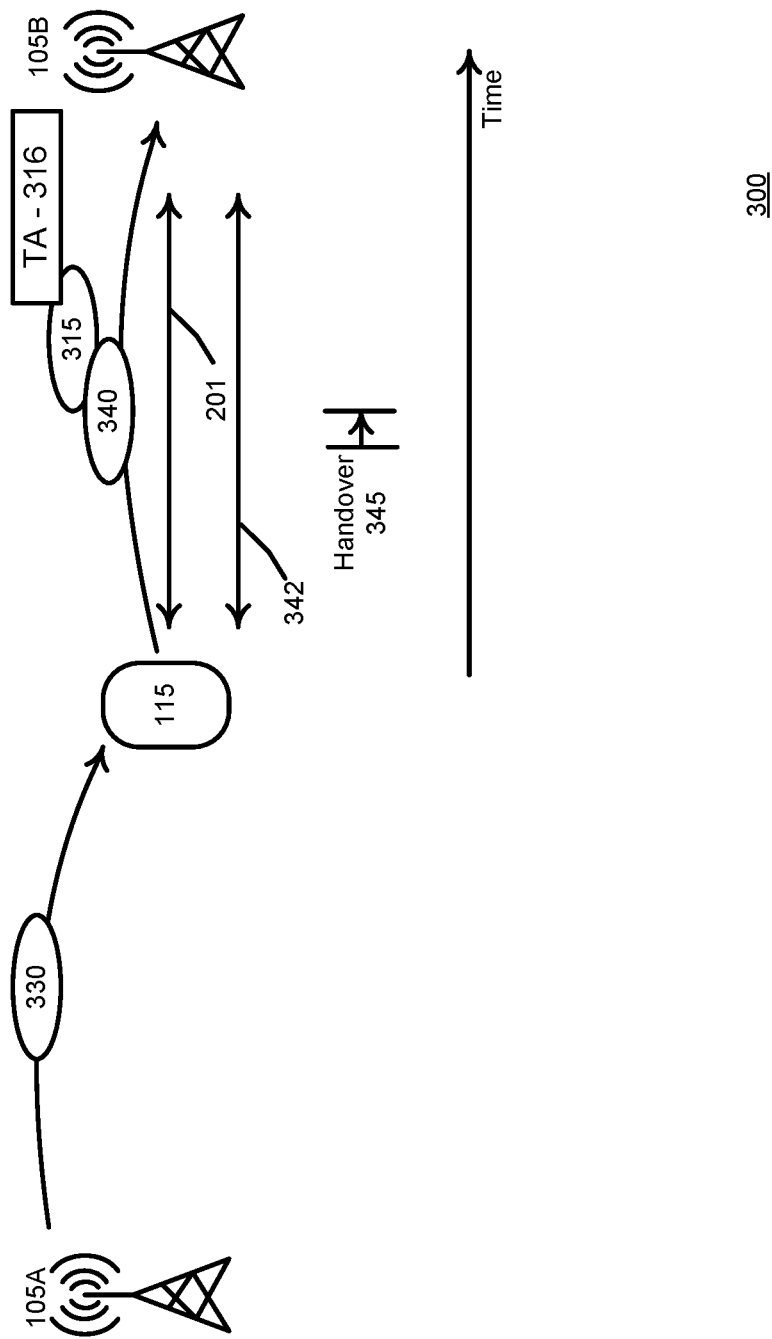
FIG. 3D illustrates an example embodiment of a user equipment establishing a communication connection with a target radio access network node according to a timing advance received from a radio access network node previously serving the user equipment.

Regardless of which embodiment shown in either FIG. 3B or FIG. 3C is used to deliver TA 316 to UE 115 to use during a handover, when serving RAN 105A determines to initiate a handover of UE 115 to RAN 105B, RAN 105A transmits to UE 115 a handover indication 330 message as shown in FIG. 3D. Handover indication message 330 may comprise TA message 319 (described in reference to FIG. 3C) or the TA message may comprise the handover indication. Responsive to receiving handover indication 330, UE 115 may transmit TA 315 to RAN 105B via a handover initiation message 340 to perform a handover. Handover duration 345 is illustrated in FIG. 3D taking much less time than either TA gap 325 shown in FIG. 3B or timing gap 335 shown in FIG. 3C. Thus, connection 202 between RAN 105A and UE 115 is deactivated and second connection 342 between RAN 105B and UE 115 is almost immediately (e.g., imperceptible to a user of the UE) established with RAN 105B as the UE's new serving RAN and the UE may resume, with RAN 105B, communication session 201 that was previously being conducted with RAN 105A via first connection 202 with minimal delay because TA acquisition during handover is avoided. It will be appreciated that RAN 105A may schedule either TA gap 325 or 335 to occur during a dormant period during which no traffic is scheduled to be communicated between UE 115 and RAN 105A such that session 201 is not impacted while the UE is cooperating with RAN 105B in determining a TA 316 corresponding to RAN 105B during a timing advance gap.

Turning now to FIG. 12, the figure illustrates a proactive/prospective timing advance acquisition configuration 1200. Via configuration 1200, a source RAN may configure an active/connected user equipment device with proactive/prospective TA acquisition information, that may comprise a target RAN/cell identifier 105 indicative of a target cell RAN with which the UE is to cooperate to prospectively measure and report a TA. The target RAN/cell identifier 105 may be indicative of a RAN that is one of a group of RAN nodes, determined by a serving RAN node, based on being adjacent to, or a neighbor to, the source RAN/cell that a UE may be likely to report as providing a best signal strength. (An adjacent or neighbor RAN node may be referred to as a surrounding RAN node.) For each target RAN/cell indicated by an indication 105, configuration 1200 may comprise a corresponding TA preamble 220, or preamble identifier, that may comprise an index or explicit information of a special TA uplink preamble to be used to trigger prospective TA determination at a RAN 105 corresponding to the preamble identifier 220 in configuration 1200. It will be appreciated that a neighbor RAN may have already received a preamble 220 from a serving RAN as described in reference to FIG. 2.

Configuration 1200 may also comprise measurement gap information 1215 that may comprise timing and frequency resources via which a user equipment should transmit a corresponding TA preamble 220 towards the target RAN/cell. During the TA gap/timing period to be used to measure a TA corresponding to a RAN identified by a corresponding identifier 105 with respect to the UE, a currently established communication session between the UE and the serving RAN will be halted (e.g., a time gap is a period during which resources for the communication session are not to be scheduled for the UE by the serving RAN).

Configuration 1200 may comprise a TA acquisition mode indication 1220 to be indicative to a user equipment of a mode by which the user equipment is to receive a TA measured by a RAN identified by a corresponding identifier 105. For example, TA acquisition mode indication 1220 may be indicative that a UE is to receive a TA from a target RAN 105 conducting a measurement of a TA (e.g., the embodiment shown in FIG. 3B). In another example, a TA acquisition mode indication 1220 may be indicative to a UE that the source RAN/cell will receive a measured TA from a target RAN via backhaul interface link and that the source RAN will transmit the TA to the UE (e.g., the embodiment shown in FIG. 3C). If the mode indicated in indication 1220 is for the serving RAN to transmit the TA to the UE, based on the mode indication, the UE may only transmit a configured TA preamble to a potential target RAN and may immediately switch back to the source RAN and resume an ongoing session therewith without waiting for the TA measurement report from the target RAN.

In case the TA acquisition mode indication 1220 indicates that the source RAN is to receive a TA measurement report from a target RAN, the source RAN may transmit a TA measurement report request to a target RAN after a corresponding TA measurement period/duration gap expires. The TA measurement report request may indicate a TA preamble identifier or index for which the TA measurement reporting is being requested. The target RAN may respond back with a measured proactive/prospective TA measurement level that corresponds to the signaled preamble identifier received from the source RAN. The source/serving RAN, after collecting a proactive/prospective TA measurement report from an adjacent cell, may transmit a measured/determined TA to a UE, via an RRC signaling message (e.g., message 1300 shown in FIG. 13), that is to be handed over towards the target RAN to which the measured/determined TA corresponds. Message 1300 may comprise TA 315B corresponding to RAN 105B or TA 315C corresponding to RAN 105C (shown in FIG. 1).

Figure 4:
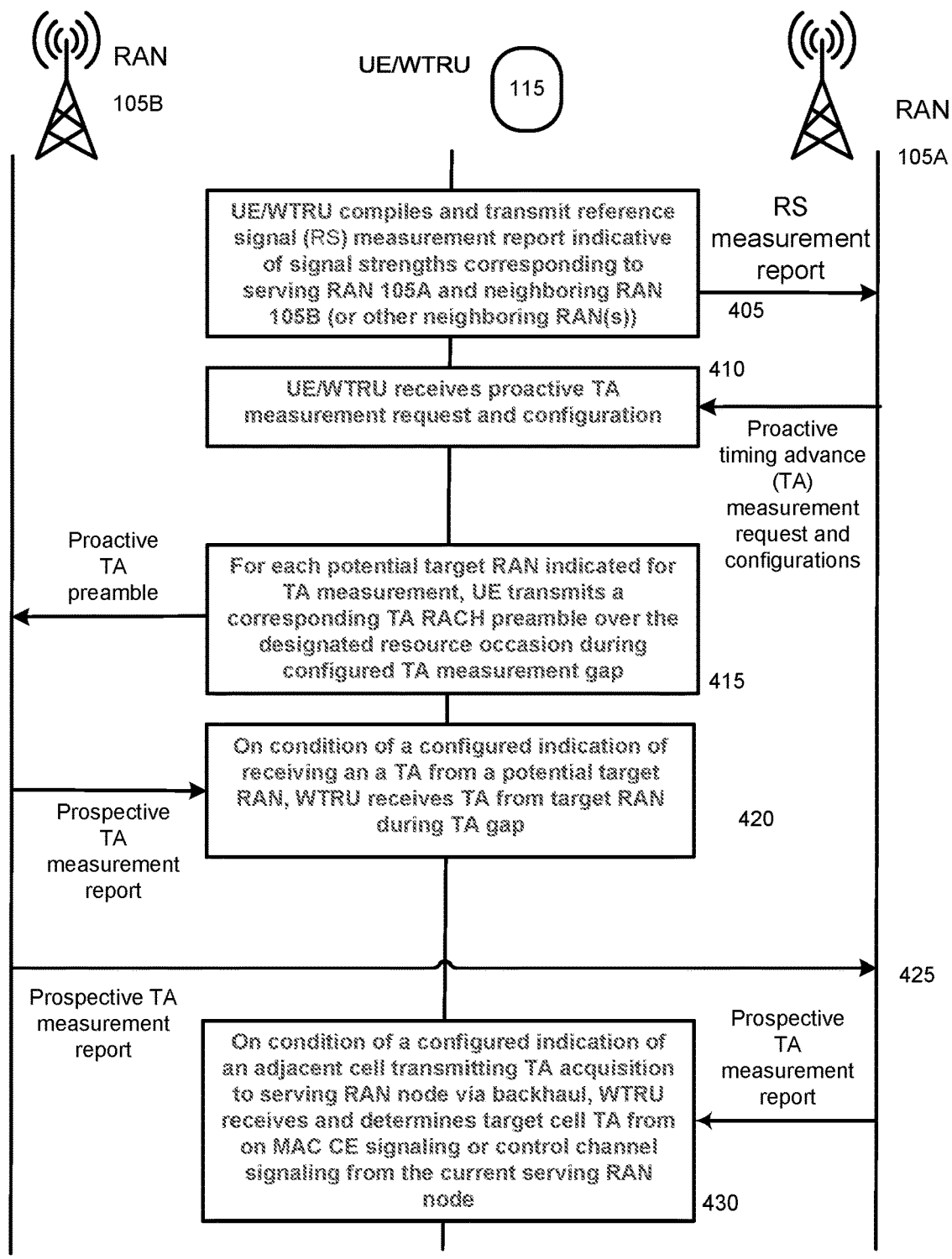
FIG. 4 illustrates a timing diagram of a user equipment establishing a communication connection with a radio access network node according to a timing advance obtained before establishing the communication connection.

FIG. 4 illustrates a timing diagram of an example embodiment method 400. At act 405, WTRU 115 may compile and transmit a reference signal measurement report indicative of signal strengths corresponding to serving RAN 105A and neighboring RAN nodes 105B to the serving RAN node. At act 410, UE/WTRU 115 may receive a proactive/prospective timing advance measurement request and TA configurations (e.g., configuration 1200 shown in FIG. 12) from serving RAN 105A. A TA configuration may comprise (1) one or more target cell identifiers for which the TA is to be measured, (2) one or more TA measurement gap(s) associated with each indicated target RAN identifier, (3) one or more random access preambles ("RACH"), or indexes corresponding thereto, to be used for prospective/proactive TA acquisition, and (4) TA acquisition mode indication (e.g., to indicate that either the serving RAN is to acquire a TA determined with respect to UE 115 from one or more target RAN(s), or that the UE is to acquire a TA using RRC signaling from a respective indicated target RAN).

For each target RAN indicated for TA measurement/determination, UE 115 may transmit, at act 415, the indicated RACH preamble(s) via resource occasion(s), configured with respect to target RAN(s), during the configured TA measurement gap period(s). On condition of a configured mode indication indicating that UE 115 is to receive a determined TA from the potential target RAN(s) that determined the TA(s), at act 420 UE 115 may receive a TA(s) via radio RRC signaling from the target RAN(s) (e.g., from currently non-serving RANs). On condition of a configured mode indication being indicative that a target RAN is to transmit a TA determined with respect to UE 115 to the current serving RAN 105A, RAN 105B transmits, at act 425, a TA determined with respect to UE 115 to RAN 105A. At act 430, UE 115 may receive a TA, corresponding to RAN 105B and determined with respect to the UE, from current serving RAN 105A via MAC CE signaling or control channel signaling.

Figure 5:
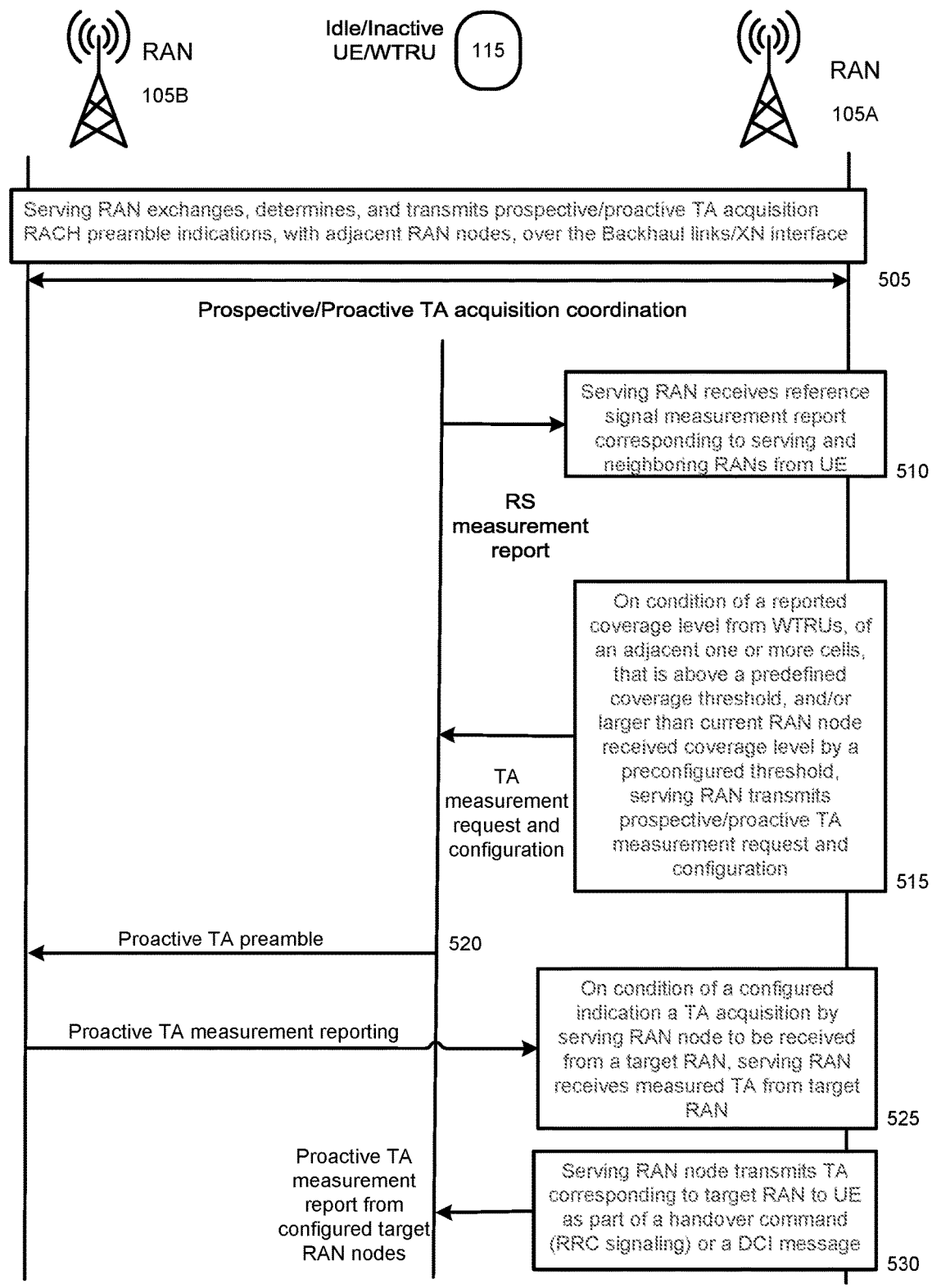
FIG. 5 illustrates a timing diagram of an example embodiment of a serving radio access network node facilitating handover of a user equipment to a target radio access network node according to a timing advance determined by the target radio access network node.

FIG. 5 illustrates a timing diagram of an example embodiment 500. At act 505, serving RAN 105A and potential target RAN 105B determining and exchange prospective/proactive TA acquisition configurations, that may comprise RACH preambles 220 (described in reference to FIG. 2), or RACH indications/indexes, via a backhaul link/Xn interface. A RACH preamble 220, or indication thereof, may be specific to UE 115 and may be dedicated for proactive/prospective TA acquisition. A RACH preamble 220, or indication thereof, may be specific to RAN 105B and may be dedicated for proactive/prospective TA acquisition. At act 510, serving RAN node 105A receives reference signal measurement report(s) from UE 115 corresponding to serving RAN 105A and corresponding to neighboring RANs, including RAN 105B. On condition of a reported coverage level received from UE 115 corresponding to adjacent RAN 105B exceeding, for example, a predefined coverage threshold, or, for example, being larger than a reported coverage level corresponding to RAN 102A by a preconfigured amount, RAN node 105A may transmit at act 515 a proactive/prospective TA measurement request that may comprise a configuration (e.g., configuration 1200 described in reference to FIG. 12) to UE 115. A TA measurement request or configuration may include (1) one or more target RAN identifiers, including RAN 105B, for which a TA to be measured, (2) one or more TA measurement gap(s) associated with each indicated target RAN identifier, (3) RACH preamble, or RACH index, to be used for prospective/proactive TA acquisition, and (4) TA acquisition mode indication. At act 520, UE 115 transmits a RACH corresponding, in the configuration received at act 515 to RAN 105B, to RAN 105B.

On condition of a configured TA acquisition mode indication indicative of RAN 105A receiving a TA corresponding to RAN 105B from RAN 105B, at act 525 RAN node 105A receives a measured TA from, for example, each of the configured target (adjacent) RANs indicated in the configuration received at act 515, including a TA corresponding to RAN 105B determined with respect to UE 115B. At act 530 RAN node 105A transmits to UE 115 the determined TA measurement corresponding to RAN 105B received at act 525 as part of either a handover command (e.g., via RRC signaling), or via downlink control information (e.g., via DCI signaling).

Figure 6:
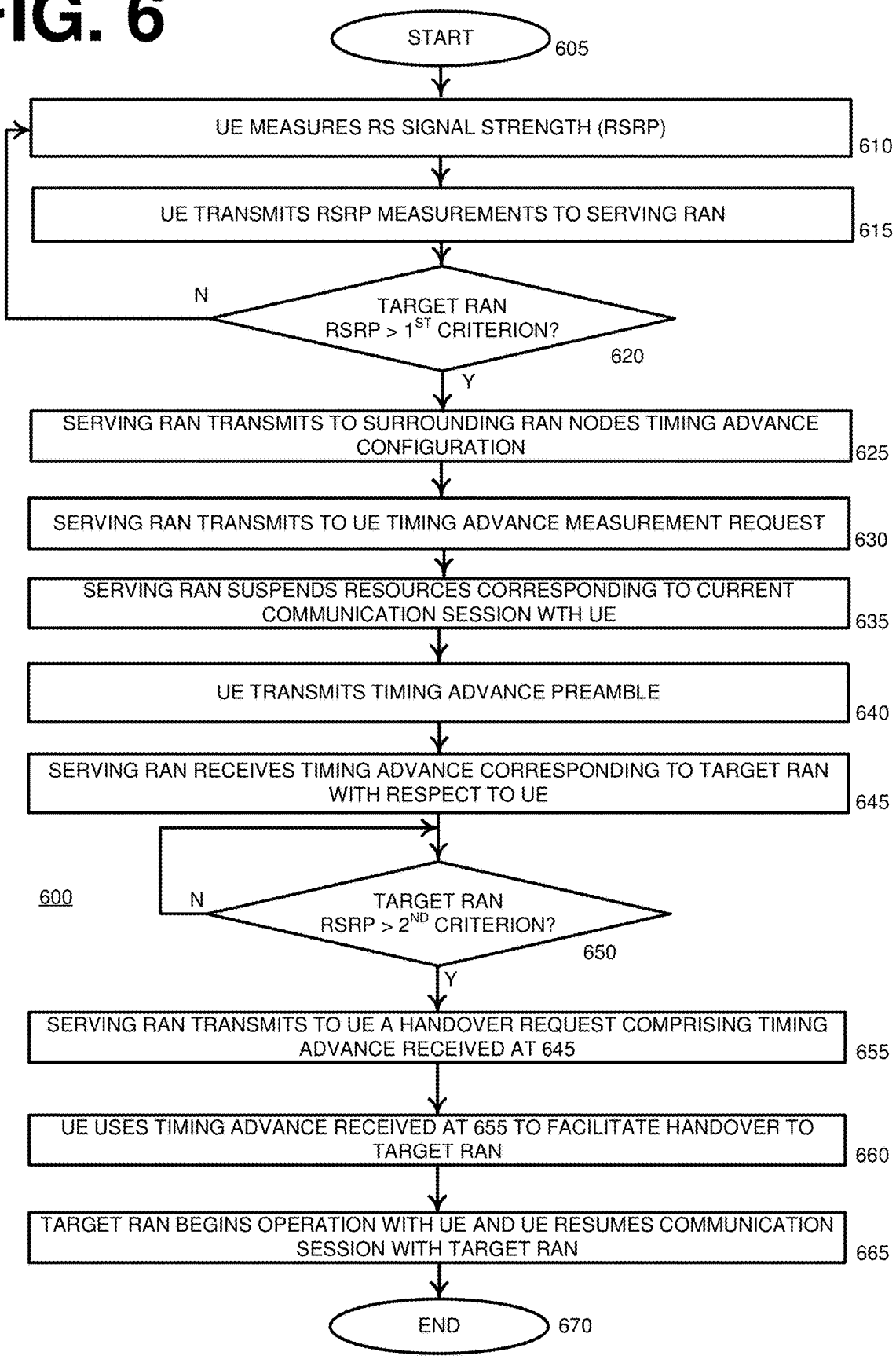
FIG. 6 illustrates a flow diagram of an example embodiment method of a user equipment being handed over to a target radio access network node using a timing advance determined before the handover.

FIG. 6 illustrates a flow diagram of an example embodiment method 600. Method 600 begins at act 605. At act 610, an active mode user equipment may measure a signal strength of a reference signal and transmit at act 615 a value corresponding to the measured signal strength to a radio access network node serving the user equipment. At act 620, the serving radio access network node may receive the signal strength value transmitted at act 615 and determine whether the signal strength value satisfies a first handover criterion. The first handover criterion may be used by the serving radio access network node to determine whether to request that the user equipment perform a prospective timing advance determination procedure before the serving radio access network node determines whether to hand over serving of the user equipment to another radio access network node. For example, if the signal strength value received at act 615 indicates that the radio access network node to which the received signal strength value corresponds is a stronger signal strength than a signal strength value, determined by the user equipment, that corresponds to the serving radio access network node itself, method 600 may advance to act 625. If a determination is made that the first handover criterion is not met at act 620, method 600 returns to act 610.

Returning to description of act 625, the serving radio access network node may transmit, via backhaul communication links, to surrounding, adjacent, or neighboring radio access network nodes a timing advance preambles, for example preambles 220 described in reference to FIG. 2. The timing advance preambles may be special preambles respectively corresponding to the surrounding radio access network nodes. The timing advance preambles may be indicative to the one or more of the surrounding radio access network nodes that if a timing advance request is received from a user equipment that comprises a timing advance preamble corresponding to the respective radio access network node, the radio access network node is to perform, in cooperation with the user equipment, a determination of a timing advance corresponding to the radio access node with respect to the user equipment.

At act 630, the serving radio access network node may transmit to the user equipment a timing advance measurement request message that may indicate one or more of the surrounding radio access network nodes with respect to one or more of which a timing advance is to be determined. The timing advance measurement request transmitted at act 630 to the user equipment may comprise a timing advance preamble corresponding to the one or more radio access network nodes. At act 635, the serving radio access network node may suspend resources corresponding to a current communication session that is active with the user equipment. At act 640, the user equipment may transmit one or more of the timing advance preambles transmitted at act 630 in the timing advance measurement request to one or more surrounding nodes corresponding to the preambles. The user equipment may transmit the one or more timing advance preambles during a timing advance gap during which resources corresponding to the current communication session that were suspended at act 635 remain suspended.

In an embodiment, upon transmitting the timing advance preambles to respective radio access network nodes at act 640, the user equipment may resume the communication session with the serving radio access network node according to the resources that were suspended at act 635 and that remained suspended during the timing advance gap. Thus, the timing advance gap may be configured to be just long enough for the user equipment to transmit the timing advance preamble, or timing advance preambles, to the one or more surrounding radio access network nodes without waiting to receive back one or more timing advance values from the surrounding radio access network nodes to which the user equipment may have been instructed to transmit the preambles (via the timing advance measurement request transmitted to the user equipment at act 630). Instead, at act 645, the serving radio access network node may receive from the one or more surrounding radio access network nodes one or more determined timing advance(s) corresponding to the respective one or more surrounding nodes with respect to the user equipment.

However, in another embodiment, the timing advance measurement request transmitted to the user equipment at act 630 may have configured a timing advance gap of a long enough period (e.g., resources with a serving RAN being used for a current communication are suspended long enough) for the user equipment to not only transmit the one or more timing advance preambles to the corresponding surrounding radio access network nodes using different resources but also long enough for a determination of a timing advance corresponding to the one or more surrounding radio access network nodes to be determined and transmitted back to the user equipment. Accordingly, the surrounding radio access network nodes that determine the timing advance with respect to the user equipment may transmit corresponding timing advance values (e.g., corresponding to a given RAN with respect to the user equipment) to the user equipment during a configured timing advance gap.

At act 650, the serving radio network node may determine whether a signal strength corresponding to the serving radio access network node or one of the surrounding radio access network nodes satisfies a second handover criterion. The second handover criterion may be used by the serving radio access network node to determine whether to initiate handover of the user equipment to one of the surrounding radio access network nodes corresponding to which a timing advance has already been determined. For example, if the user equipment has been moving during a period during which acts 625 through 645 were performed, and a signal strength corresponding to one of the surrounding radio access nodes is determined to be even stronger than a signal strength determination that was made at act 620 corresponding to the same surrounding node, a serving radio access network node may determine to hand over the user equipment to the surrounding radio access network node corresponding to the stronger signal strength. If a determination is made at act 650 that a most-recently-received signal strength does not satisfy a second hand over criterion method 600 may return to act 650.

Continuing with description at act 650, if a determination is made that a received signal strength corresponding to a surrounding radio access network node satisfies the second handover criterion, method 600 advances to act 655. At act 655, the serving radio access network node may transmit to the user equipment a handover request message that may comprise the timing advance received from the surrounding radio access network node at act 645. If the surrounding radio access network node was configured to transmit the timing advance corresponding thereto to the user equipment, the handover request message transmitted to the user equipment at act 655 may not include the timing advance corresponding to the surrounding radio access network node to which the user equipment is to be handed over because the user equipment may have already received the timing advance from the surrounding radio access network node to which it is being handed over. At act 660, the user equipment uses the timing advance, either received at act 655 or received directly from the surrounding radio access network node that transmitted the timing advance in response to receiving the timing advance preamble at act 640, to perform handover to the surrounding radio access network node. At act 665, the user equipment and the target surrounding radio access network node to which the user equipment was handed over begin operation via a connection therebetween of a communication session that had been active with the previous serving radio access network node via a connection between the previous serving radio access network node and the user equipment. Method 600 advances from act 665 to act 670 and ends.

Figure 7:
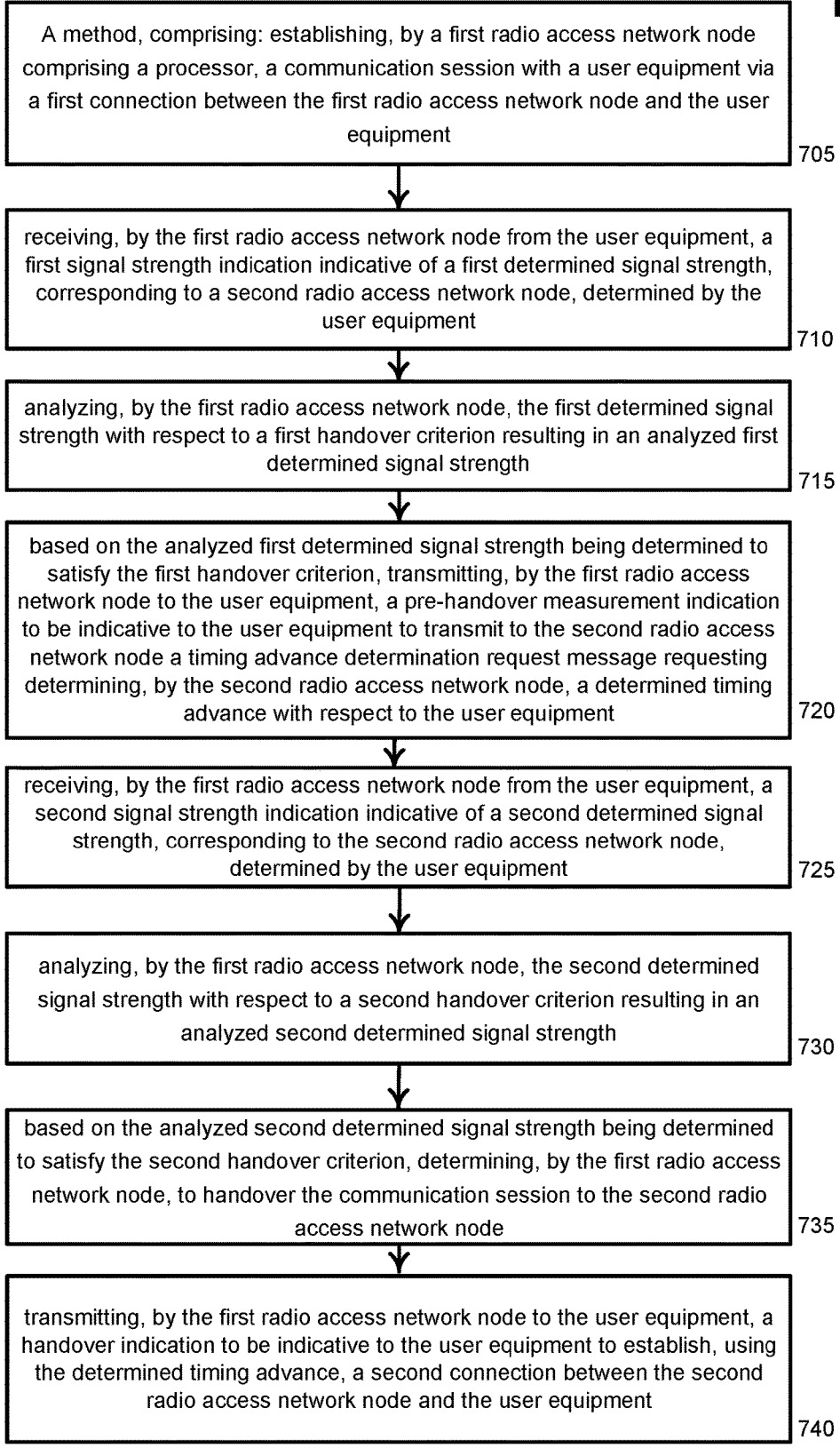
FIG. 7 illustrates a block diagram of an example method embodiment.

Turning now to FIG. 7, the figure illustrates an example embodiment method 700 comprising at block 705 establishing, by a first radio access network node comprising a processor, a communication session with a user equipment via a first connection between the first radio access network node and the user equipment; at block 710 receiving, by the first radio access network node from the user equipment, a first signal strength indication indicative of a first determined signal strength, corresponding to a second radio access network node, determined by the user equipment; at block 715 analyzing, by the first radio access network node, the first determined signal strength with respect to a first handover criterion resulting in an analyzed first determined signal strength; at block 720 based on the analyzed first determined signal strength being determined to satisfy the first handover criterion, transmitting, by the first radio access network node to the user equipment, a pre-handover measurement indication to be indicative to the user equipment to transmit to the second radio access network node a timing advance determination request message requesting determining, by the second radio access network node, a determined timing advance with respect to the user equipment; at block 725 receiving, by the first radio access network node from the user equipment, a second signal strength indication indicative of a second determined signal strength, corresponding to the second radio access network node, determined by the user equipment; at block 730 analyzing, by the first radio access network node, the second determined signal strength with respect to a second handover criterion resulting in an analyzed second determined signal strength; at block 735 based on the analyzed second determined signal strength being determined to satisfy the second handover criterion, determining, by the first radio access network node, to handover the communication session to the second radio access network node; and at block 740 transmitting, by the first radio access network node to the user equipment, a handover indication to be indicative to the user equipment to establish, using the determined timing advance, a second connection between the second radio access network node and the user equipment.

Figure 8:
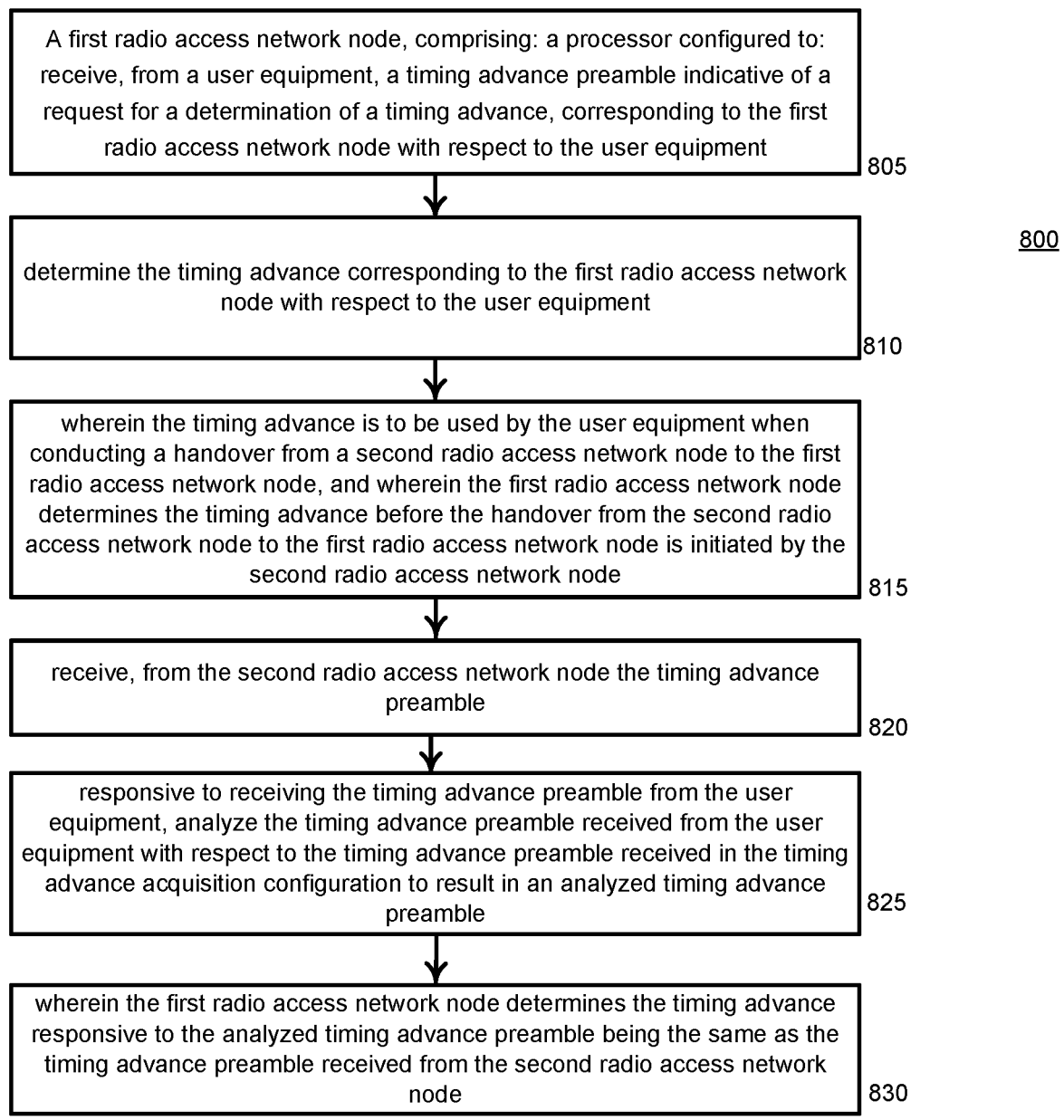
FIG. 8 illustrates a block diagram of an example radio access network node embodiment.

Turning now to FIG. 8, the figure illustrates an example first radio access network node, comprising at block 805 a processor configured to receive, from a user equipment, a timing advance preamble indicative of a request for a determination of a timing advance, corresponding to the first radio access network node with respect to the user equipment; at block 810 determine the timing advance corresponding to the first radio access network node with respect to the user equipment; at block 815 wherein the timing advance is to be used by the user equipment when conducting a handover from a second radio access network node to the first radio access network node, and wherein the first radio access network node determines the timing advance before the handover from the second radio access network node to the first radio access network node is initiated by the second radio access network node; at block 820 receive, from the second radio access network node the timing advance preamble; at block 825 responsive to receiving the timing advance preamble from the user equipment, analyze the timing advance preamble received from the user equipment with respect to the timing advance preamble received in the timing advance acquisition configuration to result in an analyzed timing advance preamble; and at block 830 wherein the first radio access network node determines the timing advance responsive to the analyzed timing advance preamble being the same as the timing advance preamble received from the second radio access network node.

Figure 9:
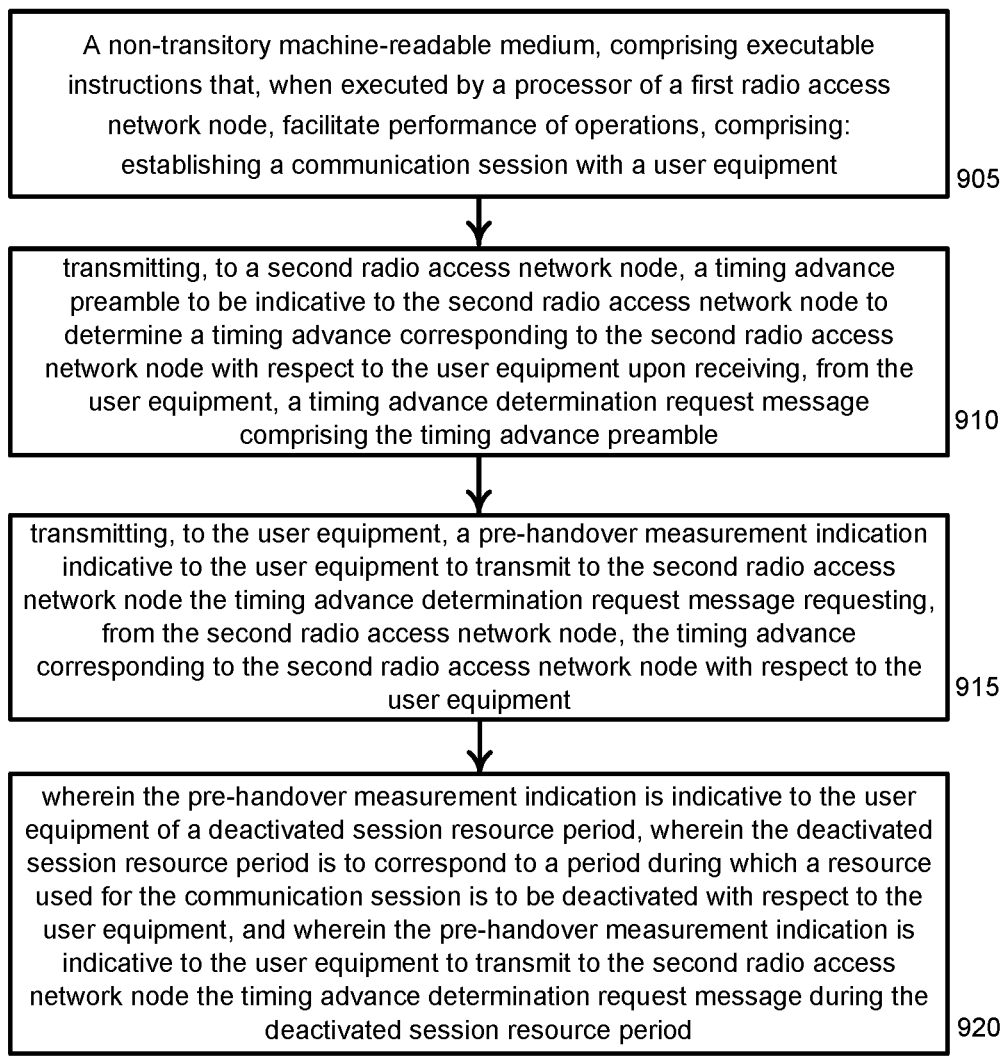
FIG. 9 illustrates a block diagram of an example non-transitory machine-readable medium embodiment.

Turning now to FIG. 9, the figure illustrates a non-transitory machine-readable medium 900 comprising at block 905 executable instructions that, when executed by a processor of a first radio access network node, facilitate performance of operations, comprising establishing a communication session with a user equipment; at block 910 transmitting, to a second radio access network node, a timing advance preamble to be indicative to the second radio access network node to determine a timing advance corresponding to the second radio access network node with respect to the user equipment upon receiving, from the user equipment, a timing advance determination request message comprising the timing advance preamble; at block 915 transmitting, to the user equipment, a pre-handover measurement indication indicative to the user equipment to transmit to the second radio access network node the timing advance determination request message requesting, from the second radio access network node, the timing advance corresponding to the second radio access network node with respect to the user equipment; and at block 920 wherein the pre-handover measurement indication is indicative to the user equipment of a deactivated session resource period, wherein the deactivated session resource period is to correspond to a period during which a resource used for the communication session is to be deactivated with respect to the user equipment, and wherein the pre-handover measurement indication is indicative to the user equipment to transmit to the second radio access network node the timing advance determination request message during the deactivated session resource period.

Figure 10:
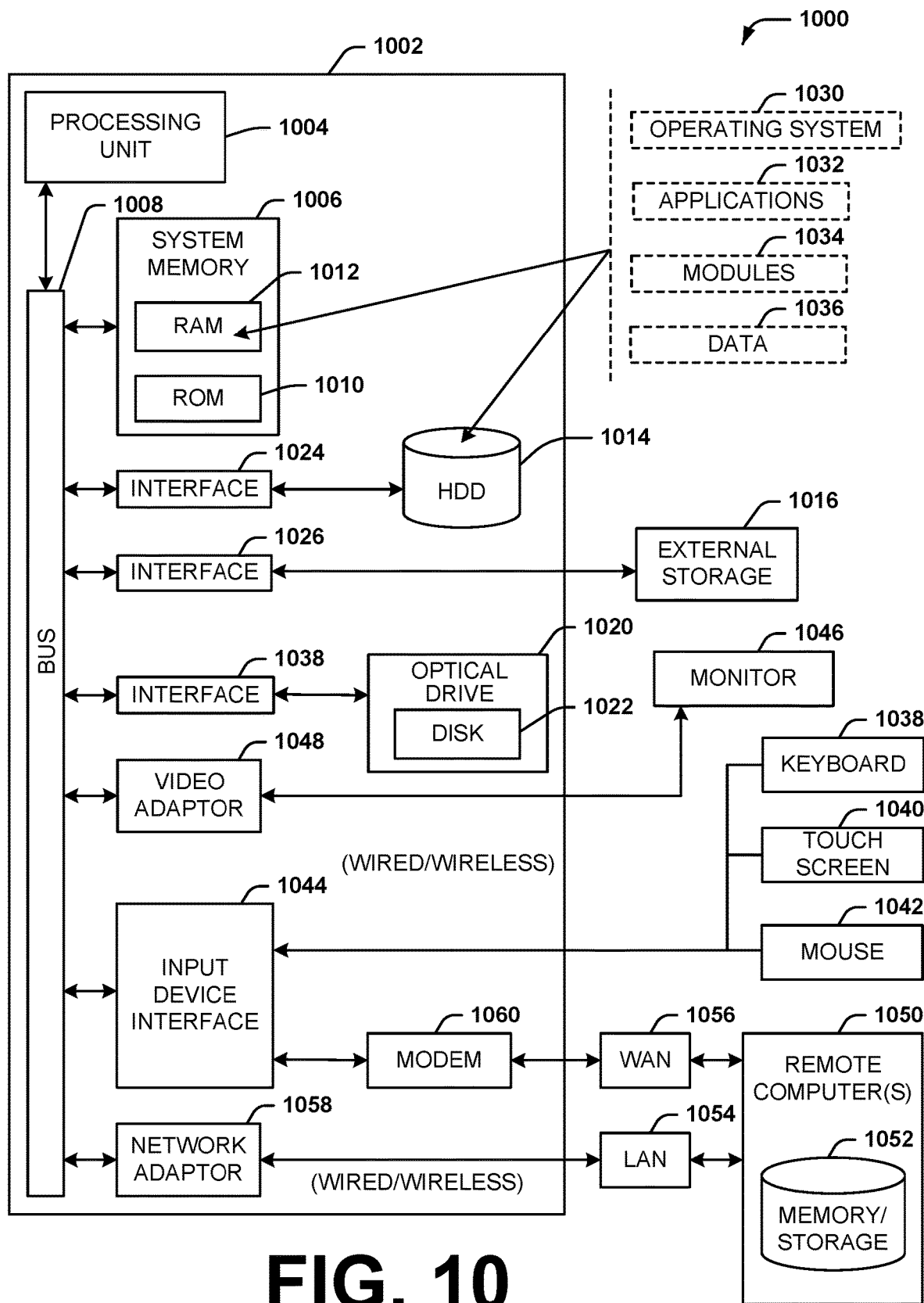
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1010. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
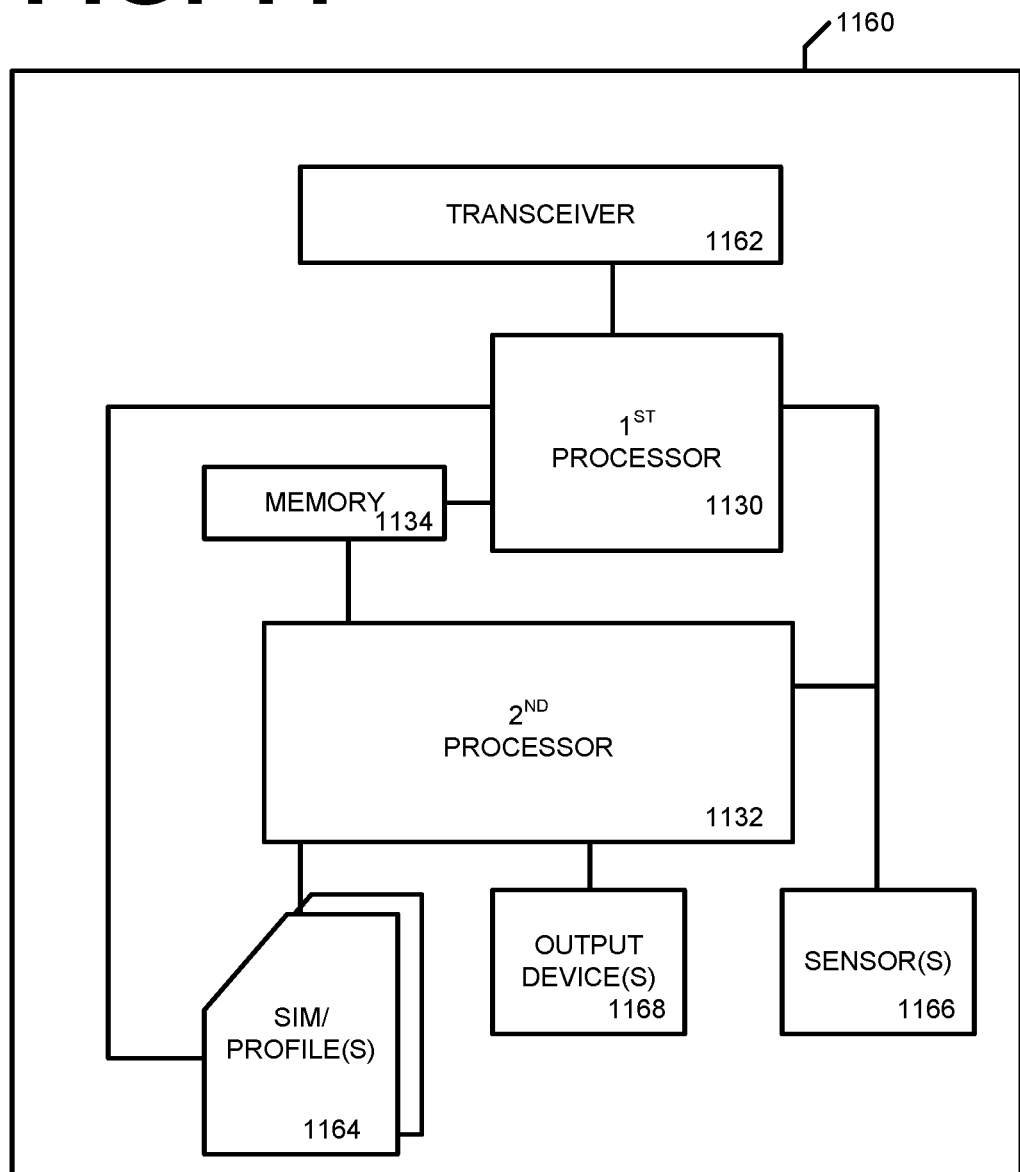
FIG. 11 illustrates a block diagram of an example wireless user equipment.

Turning now to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 34 or a separate memory portion), for facilitating wireless communication with RAN 105 or core network 130 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 30 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/in a low power state when UE 1160 does not need it for executing applications and processing data related to an application provides an advantage of reducing power consumption when the UE only needs to use the first processor portion 1130 while in listening mode for monitoring routine configured bearer management and mobility management/maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, that are external to UE 1160.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |

TABLE 1-continued

| Term | Definition |
| --- | --- |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    establishing, by a first radio access network node comprising a processor, a communication session with a user equipment via a first connection between the first radio access network node and the user equipment;
    receiving, by the first radio access network node from the user equipment, a first signal strength indication indicative of a first determined signal strength, corresponding to a second radio access network node, determined by the user equipment;
    analyzing, by the first radio access network node, the first determined signal strength with respect to a first handover criterion resulting in an analyzed first determined signal strength;
    based on the analyzed first determined signal strength being determined to satisfy the first handover criterion, transmitting, by the first radio access network node to the user equipment, a pre-handover measurement indication to be indicative to the user equipment to transmit to the second radio access network node a timing advance determination request message requesting determining, by the second radio access network node, a determined timing advance with respect to the user equipment;

receiving, by the first radio access network node from the user equipment, a second signal strength indication indicative of a second determined signal strength, corresponding to the second radio access network node, determined by the user equipment;

analyzing, by the first radio access network node, the second determined signal strength with respect to a second handover criterion resulting in an analyzed second determined signal strength;

based on the analyzed second determined signal strength being determined to satisfy the second handover criterion, determining, by the first radio access network node, to handover the communication session to the second radio access network node; and transmitting, by the first radio access network node to the user equipment, a handover indication to be indicative to the user equipment to establish, using the determined timing advance, a second connection between the second radio access network node and the user equipment, wherein the pre-handover measurement indication is indicative of a timing advance determining time resource, determined by the first radio access network node, during which the user equipment is to transmit the timing advance determination request message, wherein the user equipment is switched from communication with the first radio access network node to communication with the second radio access network node during the timing advance determining time resource.

2. The method of claim 1, wherein the pre-handover measurement indication comprises a timing advance preamble, and wherein the pre-handover measurement indication is indicative to the user equipment to include the timing advance preamble in the timing advance determination request message.

3. The method of claim 1, further comprising:
transmitting, by the first radio access network node to the second radio access network node, a timing advance preamble.

4. The method of claim 1, further comprising:
receiving, by the first radio access network node from the second radio access network node, the determined timing advance.

5. The method of claim 1, wherein the pre-handover measurement indication is indicative to the user equipment that the first radio access network node is to receive, from the second radio access network node, the determined timing advance.

6. The method of claim 5, further comprising:
transmitting, by the first radio access network node, the determined timing advance to the user equipment via a downlink control channel information message that comprises resource scheduling information corresponding to the first radio access network node.

7. The method of claim 1, wherein the pre-handover measurement indication comprises an identifier corresponding to the second radio access network node.

8. The method of claim 1, wherein the handover indication comprises the determined timing advance, and wherein the handover indication is transmitted via a radio access control signal message.

9. The method of claim 1, wherein the pre-handover measurement indication is indicative to the user equipment that the user equipment is to receive, from the second radio access network node, the determined timing advance.

10. The method of claim 1, wherein the pre-handover measurement indication is indicative of system information block information or synchronization signal block information corresponding to the second radio access network node.

11. The method of claim 10, wherein the pre-handover measurement indication is indicative to the user equipment that the communication session via the first connection between the first radio access network node and the user equipment is to be halted during the timing advance determining time resource.

12. The method of claim 11, wherein the pre-handover measurement indication is indicative to the user equipment that the first radio access network node is to receive, from the second radio access network node, the determined timing advance, and wherein the pre-handover measurement indication is indicative to the user equipment that the communication session via the first connection between the first radio access network node and the user equipment is to resume after the user equipment transmits the timing advance determination request message.

13. A first radio access network node, comprising:
a processor configured to:
receive, from a user equipment during a timing advance determining time resource determined by a second radio access network node, a timing advance preamble indicative of a request for a determination of a timing advance, corresponding to the first radio access network node with respect to the user equipment; and
determine the timing advance corresponding to the first radio access network node with respect to the user equipment,
wherein the timing advance is to be used by the user equipment when conducting a handover from the second radio access network node to the first radio access network node, wherein the first radio access network node determines the timing advance before the handover from the second radio access network node to the first radio access network node is initiated by the second radio access network node; and wherein the user equipment is switched from communication with the second radio access network node to communication with the first radio access network node during the timing advance determining time resource.

14. The first radio access network node of claim 13, the processor further configured to:
receive, from the second radio access network node the timing advance preamble; and
responsive to receiving the timing advance preamble from the user equipment, analyze the timing advance preamble received from the user equipment with respect to the timing advance preamble received in the timing advance acquisition configuration to result in an analyzed timing advance preamble,
wherein the first radio access network node determines the timing advance responsive to the analyzed timing advance preamble being the same as the timing advance preamble received from the second radio access network node.

15. The first radio access network node of claim 13, the processor further configured to:
transmit, to the user equipment, the timing advance.

16. The first radio access network node of claim 13, the processor further configured to:
transmit, to the second radio access network node, the timing advance.

17. A non-transitory machine-readable medium, comprising executable instructions that, when executed by a processor of a first radio access network node, facilitate performance of operations, comprising:
- establishing a communication session with a user equipment;
- transmitting, to a second radio access network node, a timing advance preamble to be indicative to the second radio access network node to determine a timing advance corresponding to the second radio access network node with respect to the user equipment upon receiving, from the user equipment, a timing advance determination request message comprising the timing advance preamble; and
- transmitting, to the user equipment, a pre-handover measurement indication indicative to the user equipment to transmit to the second radio access network node the timing advance determination request message requesting, from the second radio access network node during a deactivated session resource period determined by the first radio access network node, the timing advance corresponding to the second radio access network node with respect to the user equipment, wherein pre-handover measurement indication is indicative to the user equipment to switch from communication with the first radio access network node to communication with the second radio access network node to facilitate transmitting the timing advance determination request message to the second radio access network node.

18. The non-transitory machine-readable medium of claim 17, wherein the pre-handover measurement indication is indicative to the user equipment of the deactivated session resource period, and wherein the deactivated session resource period is to correspond to a period during which a resource used for the communication session is to be deactivated with respect to the user equipment.

19. The non-transitory machine-readable medium of claim 18, wherein the pre-handover measurement indication is indicative to the user equipment that the first radio access network node is to receive, from the second radio access network node, the timing advance, and wherein the pre-handover measurement indication is indicative to the user equipment that the resource used for the communication session is to resume after an expiration of the deactivated session resource period.

20. The non-transitory machine-readable medium of claim 18, wherein the pre-handover measurement indication is indicative to the user equipment that the user equipment is to receive the timing advance from the second radio access network node, and wherein the pre-handover measurement indication is indicative to the user equipment that the communication session is to resume after transmission, by the user equipment to the first radio access network node, of the timing advance.

* * * * *